United States Patent [19]

Nishihara

[11] Patent Number: 5,553,940
[45] Date of Patent: Sep. 10, 1996

[54] APPARATUS FOR AND METHOD OF DETECTING WATER TEMPERATURE FOR FISHING

[76] Inventor: Susumu Nishihara, 1862, Aza Iwataki, Iwataki-cho, Yosa-gun, Kyoto, Japan

[21] Appl. No.: 207,463

[22] Filed: Mar. 8, 1994

[51] Int. Cl.⁶ .......................... G01K 1/02; G01K 13/00; G01K 1/00; A01K 91/06
[52] U.S. Cl. ............................ 374/136; 374/208; 43/4
[58] Field of Search .................... 374/136, 208; 43/4, 17.1

[56] References Cited

U.S. PATENT DOCUMENTS

| | | | |
|---|---|---|---|
| 3,628,274 | 12/1971 | Wojaha | 374/136 |
| 3,721,124 | 3/1973 | Franks | 374/136 |
| 3,763,481 | 10/1973 | Potoroka, Sr. | 43/17 |
| 3,763,588 | 10/1973 | Foster | 43/4 |
| 4,000,653 | 1/1977 | Booth et al. | 374/136 |
| 4,104,917 | 8/1978 | Reith et al. | 374/136 |
| 4,428,685 | 1/1984 | Lemelson et al. | 374/163 |
| 4,444,517 | 4/1984 | Murase | 374/208 |
| 4,782,617 | 11/1988 | Peikin | 374/136 |
| 4,864,763 | 9/1989 | Peikin | 43/4 |
| 4,877,330 | 10/1989 | Torre | 374/136 |
| 4,899,480 | 2/1990 | Park | 374/136 |
| 5,065,539 | 11/1991 | Monzyk et al. | 43/4 |
| 5,115,593 | 5/1992 | Keough | 43/4 |

FOREIGN PATENT DOCUMENTS 60-242327  12/1985  Japan.

*Primary Examiner*—Diego F. F. Gutierrez
*Attorney, Agent, or Firm*—Lowe, Price, LeBlanc & Becker

[57] ABSTRACT

A water temperature gauge includes a first timer circuit in which a time for submerging the water temperature gauge to a position of a desired depth for measurement, and a measuring circuit for measuring the water temperature with the water temperature gauge after a lapse of the time set in the first timer circuit. A time which is obtained by adding a time required for the measuring circuit to measure the water temperature to the time set in the first timer circuit is set in a second timer circuit so that the measurement with the measuring circuit is automatically terminated after a lapse of the time set in the second timer circuit and the as-measured value is stored in a memory circuit and displayed on a liquid crystal display. A fisherman can confirm the underwater temperature of his fishing place by lifting up the water temperature gauge on the water surface and recognizing the display.

11 Claims, 5 Drawing Sheets

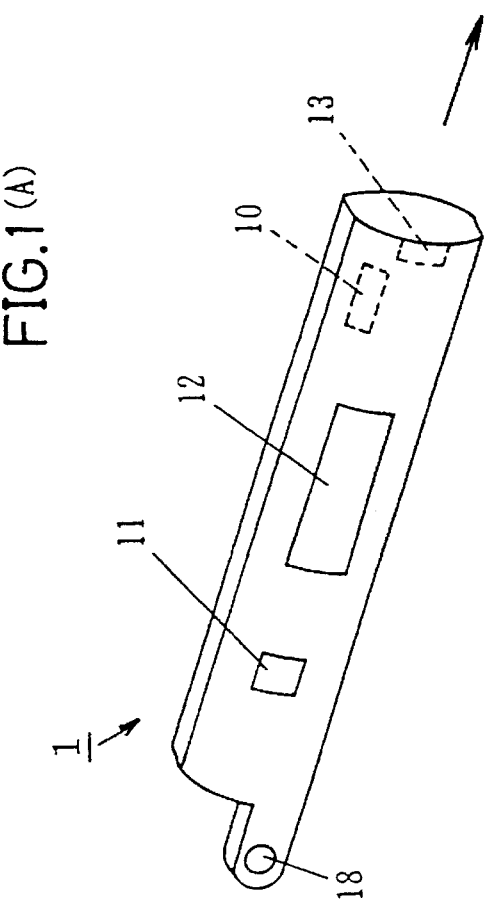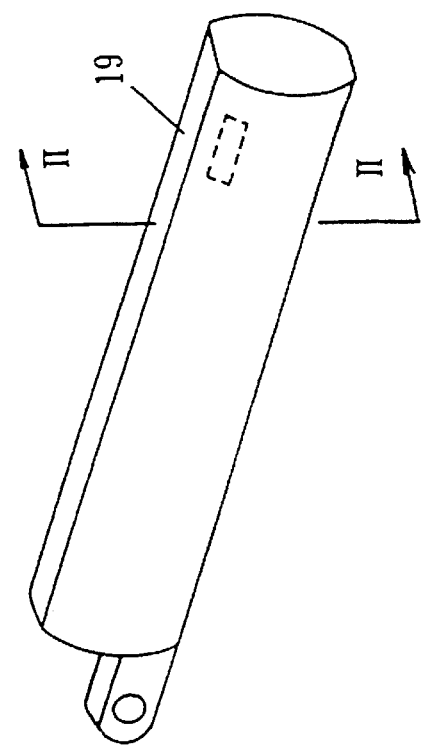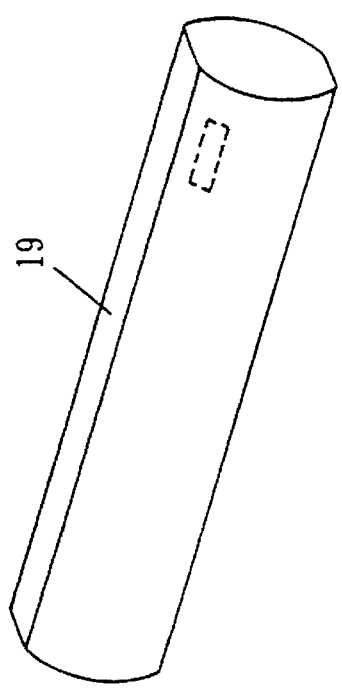
FIG.1(A)
FIG.1(B)

|   | TARGET DEPTH | WEIGHT OF SINKER | REQUIRED TIME |
|---|---|---|---|
| 1 | 25 m | 150 g | 10 SECONDS |
| 2 | 50 m | 150 g | 20 SECONDS |
| 3 | 75 m | 220 g | 30 SECONDS |
| 4 | 100 m | 220 g | 40 SECONDS |
| 5 | 125 m | 300 g | 50 SECONDS |
| 6 | 150 m | 300 g | 60 SECONDS |

APPARATUS FOR AND METHOD OF DETECTING WATER TEMPERATURE FOR FISHING

BACKGROUND OF THE INVENTION

1. Field of the Invention

The present invention relates to an apparatus for detecting a water temperature which is employed for investigation requiring measurement of an underwater temperature in a range between a position on a water surface and a shallow underwater position, and more particularly, it relates to an apparatus for detecting a water temperature which is provided with a memory.

2. Description of the Background Art

FIG. 7 shows proper water temperatures for marine life. It is understood from FIG. 7 that every marine life has a proper water temperature range. Thus, a fisherman can understand the proper temperature range for his target fish in response to its type, whereby it is possible to judge whether or not he can catch desired fish by detecting the water temperature at his fishing place.

In general, a underwater temperature in a range between a position on a water surface water and a shallow underwater position is measured with an intermediate water temperature gauge or the like, through heavy equipment utilizing a data communication network. It has been impossible for a general fisherman to get and use such equipment, which is not only high-priced but hard to carry and manipulate. Therefore, he cannot recognize whether or not the tip top of his fishing tackle is on the right spot for his target fish but merely clings to his intuition for fishing.

SUMMARY OF THE INVENTION

Accordingly, an object of the present invention is to enable a general fisherman to easily confirm the underwater temperature of his fishing place.

Another object of the present invention is to provide a method with which a fisherman can easily confirm the underwater temperature of his fishing place.

In order to attain the aforementioned objects, a water temperature detecting apparatus according to the present invention comprises a water temperature detector for detecting a water temperature, a device for vertically moving the water temperature detector between a position on a water surface and an underwater position of a desired depth, a controller for controlling the water temperature detector to operate at a prescribed time after a lapse of a desired time, and a unit for displaying the as-detected water temperature.

The water temperature detector is driven to detect the water temperature in the underwater position of the desired depth at the prescribed time after a lapse of the desired time, whereby the fisherman can previously set a time, which is required for the water temperature detector to reach the underwater position of the desired depth, in the water temperature detector as the desired time. The water temperature detector displays the temperature at the underwater position of the desired depth, so that the fisherman can recognize the as-displayed water temperature at the underwater position of the desired depth by lifting up the water temperature detector from the water. Consequently, the fisherman can easily confirm the underwater temperature at his fishing place.

According to another aspect of the present invention, a method of detecting a water temperature includes a step of submerging a water temperature gauge for detecting a water temperature to an underwater position of a desired depth, a step of measuring the water temperature at the submerged position, a step of displaying the as-measured water temperature on the water temperature gauge, and a step of lifting up the submerged water temperature gauge to a position on the water surface.

Due to the aforementioned steps included in the method of detecting a water temperature, the temperature of the desired underwater position is measured so that the water temperature of the desired position can be recognized by simply lifting up the water temperature gauge displaying the temperature. Consequently, the fisherman can easily confirm the underwater temperature of his fishing place.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 1(A) and 1(B) are typical diagrams showing the appearance of a water temperature gauge according to the present invention;

DESCRIPTION OF THE PREFERRED EMBODIMENTS

Figure 2A:
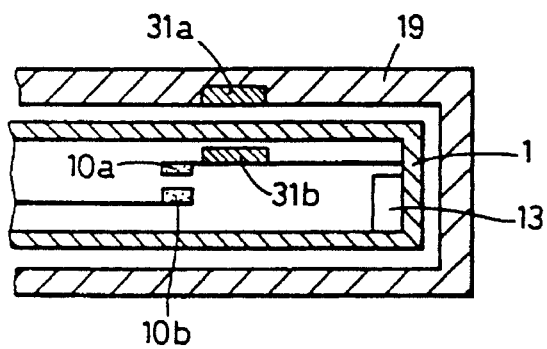
FIGS. 2(A) and 2(B) are sectional views taken along the line II—II in FIG. 1(B)

An embodiment of the present invention is now described with reference to the drawings. FIGS. 1(A) and 1(B) are typical diagrams showing a water temperature gauge 1 which is employed in the inventive apparatus for detecting a water temperature. The water temperature gauge 1 is stored in a case 19 in an unused state as shown in FIG. 1(B), while the same is taken out from the case 19 in a used state, as shown in FIG. 1(A). Referring to FIG. 1(A), the water temperature gauge 1 according to the present invention includes a reed switch 10 for starting power supply to the water temperature gauge 1, a timer set switch 11, a water temperature sensor 13 for detecting a water temperature, and a liquid crystal display 12 for displaying the water temperature detected by the water temperature sensor 13. This water temperature gauge 1 is provided in its forward end portion with a hole 18 for receiving a link for coupling the water temperature gauge 1 with a line and submerging the same to a prescribed underwater position.

Figure 2B:
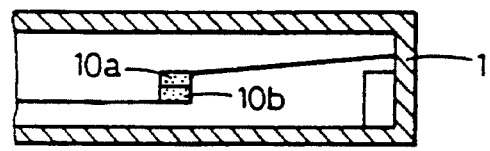

FIGS. 2(A) and 2(B) are sectional views taken along the line II—II in FIG. 1(B), showing the water temperature gauge 1 which is stored in and taken out from the case 19 respectively. Referring to FIG. 2(A), a magnet 31a is mounted on the case 19 which belongs to a body. When the case 19 is pulled along arrow as shown in FIG. 1(A), a magnet 31b which is provided on the water temperature gauge 1 is separated from the magnet 31a, so that magnets 10a and 10b of the reed switch 10 come into contact with each other, as shown in FIG. 2(B). Consequently, the water temperature gauge 1 is supplied with power.

The body of the temperature gauge 1 is made of a colored reinforced plastic material, and the portion of the liquid display 12 is in a transparent state. An insulator is inserted in the interior of the water temperature gauge 1, so that the measuring equipment including the water temperature sensor 13 and a space of the outer surface of the body can withstand the water pressure. Further, the water temperature gauge 1 is in a throwaway structure with an unexchangeable battery, due to a closed state. However, the structure of the water temperature gauge 1 is not restricted to the above.

Figure 3:
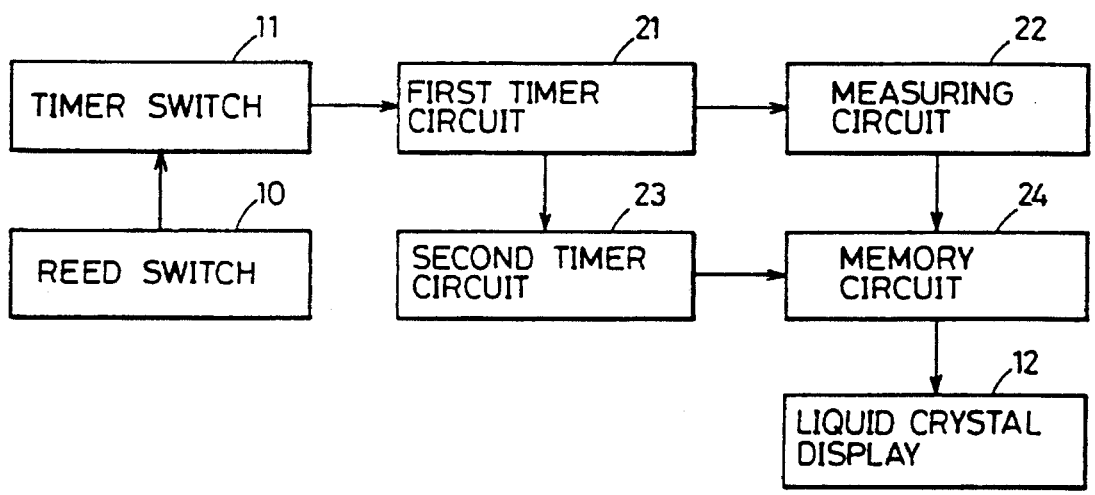
FIG. 3 is a block diagram showing a principal part of a control part for the water temperature gauge according to the present invention.

FIG. 3 is a block diagram showing a control part for the water temperature gauge 1. Referring to FIG. 3, the control part for the water temperature gauge 1 includes the reed switch 10, the timer switch 11, a first timer circuit 21 which starts its operation when the timer switch 11 is turned on, a measuring circuit 22, including the water temperature sensor 13, which is connected to the first timer circuit 21, a second timer circuit 23 which is connected to the first timer circuit 21, a memory circuit 24 which is connected to the second timer circuit 23 and the measuring circuit 22 for storing data obtained in the measuring circuit 22, and the liquid crystal display 12 which is connected to the memory circuit 24 for displaying the value measured in the measuring circuit 22.

The reed switch 10 turns on, off and resets the power source for the water temperature gauge 1. The first timer circuit 21 stops operation of the measuring circuit 22 in a set time. When the first timer circuit 21 starts its operation, the second timer circuit 23 also simultaneously starts its operation, and the measuring circuit 22 starts measurement of the water temperature with the water temperature sensor 13 after a lapse of the time set in the first timer circuit 21. The measuring circuit 22 measures the water temperature for a prescribed time. The second timer circuit 23 drives the memory circuit 24 after a lapse of a time set in the first timer circuit 21, so that the data measured in the measuring circuit 22 is stored in the memory circuit 24. The data stored in the memory circuit 24 is displayed on the liquid crystal display 12.

Figure 4:
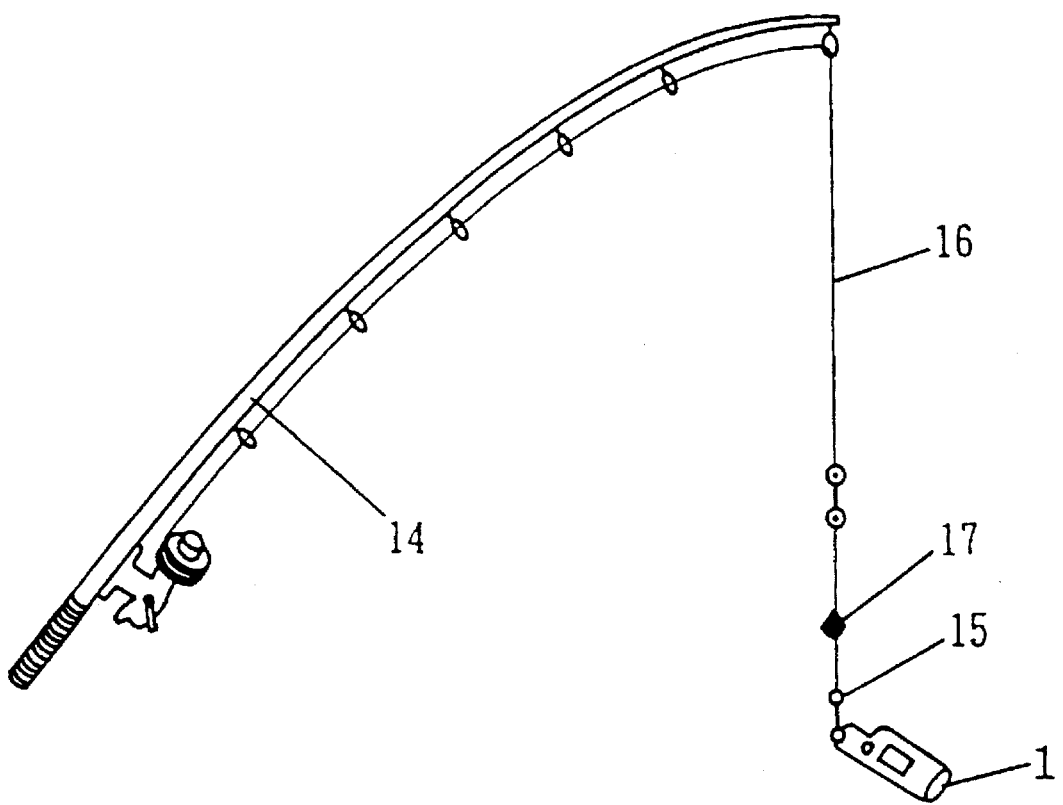
FIG. 4 is a typical diagram showing an apparatus for detecting a water temperature according to the present invention.

FIG. 4 is a typical diagram showing actual measurement of a water temperature through the water temperature gauge 1 according to the present invention. Referring to FIG. 4, an apparatus for detecting a water temperature into which the water temperature gauge 1 according to the present invention is incorporated includes the water temperature gauge 1, a link 15 holding the water temperature gauge 1, a sinker 17 and a line 16 for submerging the water temperature gauge 1 to an underwater position of a desired depth, and a fishing tackle 14, consisting of a reel, a spinning rod and the like, holding the line 16.

Figures 5, 6:
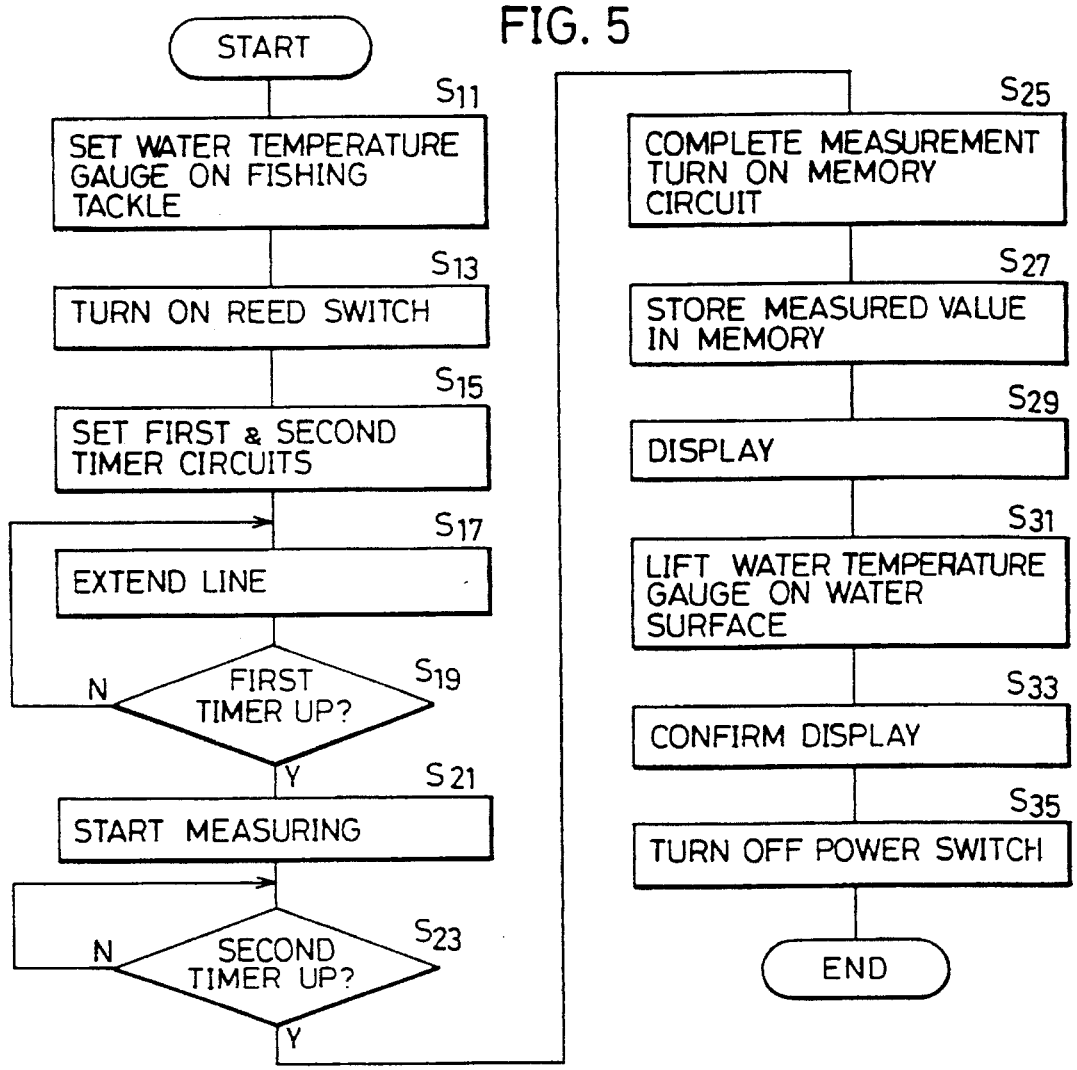
FIG. 5 is a flow chart showing operation of the apparatus for detecting a water temperature.
FIG. 6 illustrates times required for a water temperature gauge submerged in water to reach positions of target depths.
Figure 7:
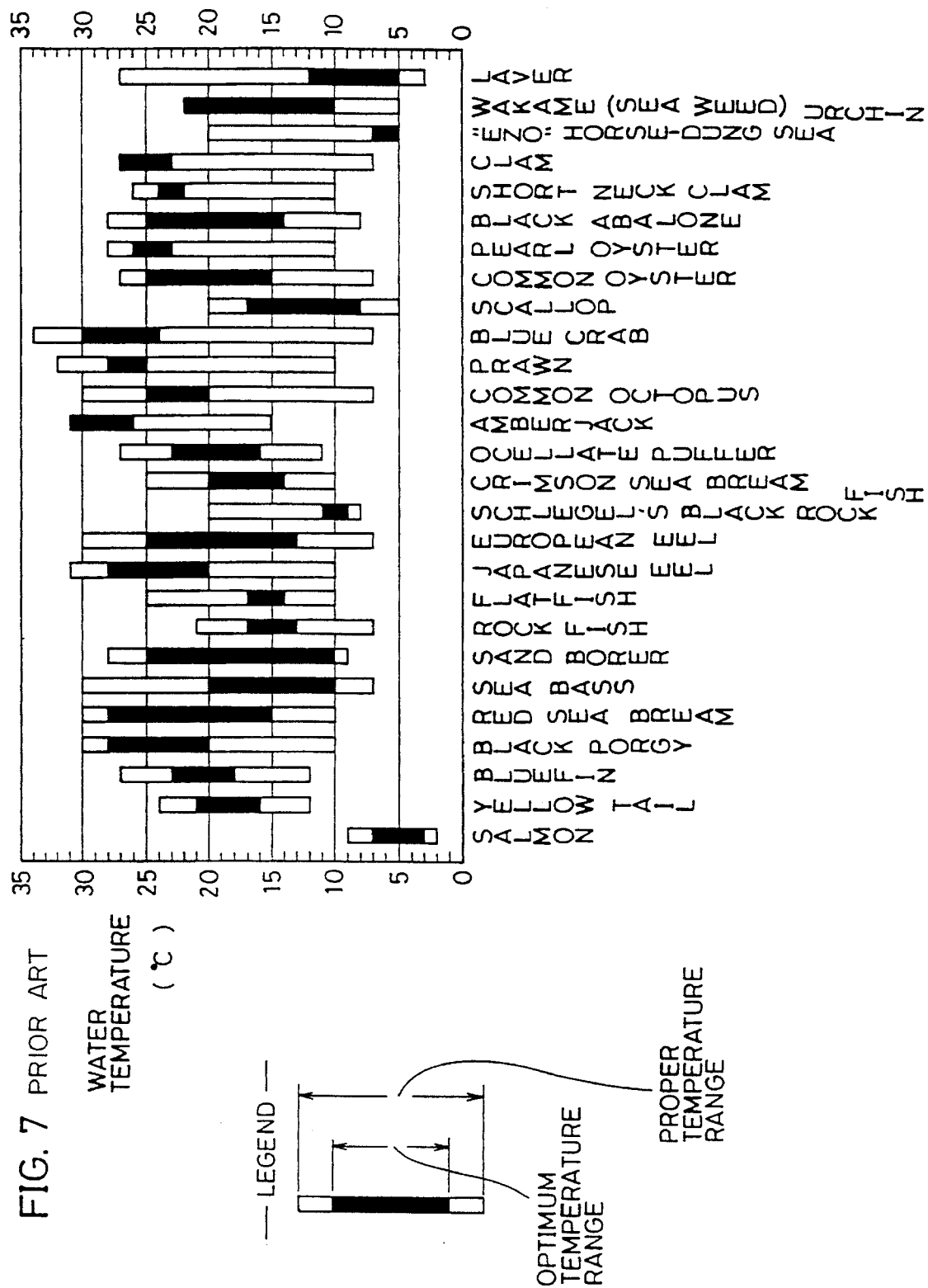
FIG. 7 illustrates proper water temperatures for marine life.

FIG. 5 is a flow chart showing the operation of the apparatus for detecting a water temperature according to the present invention. Referring to FIGS. 1 to 5, the operation of the apparatus for detecting a water temperature is now described.

First, the fishing tackle 14 provided with a reel is employed to mount the water temperature gauge 1 on the line 16 through the sinker 17 and the link 15. The fishing tackle 14 is formed by a general tackle which is capable of bottom fishing. The line 16 is color-coded every 25 m for displaying depths in colors, for example, so that the depth of position of the water temperature gauge 1 can be visually confirmed through the line 16 (S11).

Then, the water temperature gauge 1 is extracted from the case 19, to turn on the reed switch 10 (S13). Then the timer switch 11 is employed to set a time. It is possible to set a time in the first timer circuit 21 by pushing the timer switch 11, which is a pushbutton switch. For example, a time of 10 seconds can be set every time the timer switch 11 is pushed. After the time is set, the timer switch 11 is pushed for a prescribed period of 2 seconds, for example, to drive the first timer circuit 21 (S15).

Then, the line 16 provided with the water temperature gauge 1 is submerged to a position of a target depth through observation of the color display (S17). When the water temperature gauge 1 reaches the desired position of the target depth, the time set in the first timer circuit 21 is up (YES at S19), so that the measuring circuit 22 automatically starts measurement of the water temperature (S21). After a lapse of a prescribed measuring time of about 1 minute, the measurement is automatically terminated and the memory circuit 24 is turned on (S23 and S25). At this time, the second timer circuit 23 terminates the measurement and turns on the memory circuit 24. Namely, a time which is obtained by adding the measuring time to a time for the measuring circuit 22 to start its operation is previously set in the second timer circuit 23, which starts its operation with the starting of the operation of the first timer 21.

Then, the as-measured value is stored in the memory circuit 24 (S27), and displayed on the liquid crystal display 12 (S29).

The fisherman lifts up the line 16 after lapses of the time for the water temperature gauge 1 to reach the desired position and that required for the measurement, i.e., the time set in the second timer circuit 23 (S31), confirms the result of the measurement (S33), and turns off the timer switch 11 (S35).

FIG. 6 shows times required for the water temperature gauge 1, being submerged in the water, to reach positions of desired depths. The fisherman sets the time in the first timer circuit 21 with reference to the data shown in FIG. 6.

The data shown in FIG. 6 were obtained by actually submerging the water temperature gauge 1 in seawater through a general fishing tackle 14 in a state with a small current speed.

Table 1 shows exemplary specifications of the inventive water temperature gauge.

TABLE 1

| Item | Specification |
| --- | --- |
| Measurement Range | 0° C.–30° C. |
| Measurement Error | ±0.2° C. |
| Measurement Depth | 150 m (15 atm.) |
| Time Settable in Timer | 2 min. |

As shown in Table 1, the water temperature gauge 1 has a temperature measurement range of 0° to 30° C., a measurement error of ±0.2° C., and a measurable depth of 150 m. The time settable in the first timer circuit 21 is set at 2 minutes, in consideration of the data shown in FIG. 6.

Although the time in the first timer circuit 21 is set through the timer switch 11 in the aforementioned embodiment, the first timer circuit 21 may alternatively have a constant set value, to omit the timer switch 11. Further, the power switch is not restricted to the reed switch 10 which is employed in the aforementioned embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for detecting a water temperature comprising:
   a water temperature gauge including,
      water temperature detecting means for detecting a water temperature,
      a control means for controlling said water temperature detecting means to operate for a prescribed temperature measuring time after a lapse of a desired time, and
      a means for displaying said water temperature being detected by operation of said water temperature detecting means; said apparatus further comprising,
   a means for vertically moving said water temperature gauge between a position on a water surface and an underwater position of a desired depth.

2. An apparatus in accordance with claim 1, wherein said control means includes a first timer for measuring said desired time.

3. An apparatus in accordance with claim 1, wherein said water temperature gauge can be thrown away.

4. An apparatus in accordance with claim 1, wherein said water temperature gauge further includes a memory means for storing said water temperature being detected by said water temperature detecting means.

5. An apparatus in accordance with claim 1, further including storage means for storing said water temperature gauge.

6. An apparatus in accordance with claim 5, wherein said water temperature gauge further includes an operation starting switch for starting operation of said detecting means.

7. An apparatus for detecting a water temperature comprising:
   water temperature detecting means for detecting a water temperature;
   means for vertically moving said water temperature detecting means between a position on a water surface and an underwater position of a desired depth;
   control means for controlling said water temperature detecting means to operate for a prescribed temperature measuring time after a lapse of desired time, and
   means for displaying said water temperature being detected by operation of said water temperature detecting means,
   wherein said control means includes a first timer for measuring said desired time; and
   a second timer for measuring said desired time and said prescribed temperature measuring time.

8. An apparatus for detecting a water temperature comprising:
   a water temperature gauge including, a water temperature detecting means for detecting a water temperature,
   an operation starting switch for starting operation of said detecting means;
   a control means for controlling said water temperature detecting means to operate for a prescribed temperature measuring time after a lapse of a desired time,
   and a means for displaying said water temperature being detected by operation of said water temperature detecting means; said apparatus further comprising,
   a means for vertically moving said water temperature gauge between a position on a water surface and an underwater position of a desired depth, and
   a storage means for storing said water temperature gauge, wherein
   said operation switch is automatically turned on when said gauge is taken out from said storage means.

9. A method of detecting a water temperature, comprising:
   a step of submerging a water temperature gauge for detecting a water temperature to an underwater position of a desired depth;
   a step of measuring a water temperature in said submerged position including a step of controlling said water temperature gauge to measure said water temperature for a prescribed temperature measuring time after a lapse of a desired time;
   a step of displaying said water temperature on said water temperature gauge as it is being measured; and
   a step of lifting up said submerged water temperature gauge to a position on a water surface.

10. A method in accordance with claim 9, further including a step of storing said measured water temperature.

11. A method in accordance with claim 9, wherein said step of controlling said water temperature gauge includes a step of starting said measurement upon a lapse of the desired time set by a timer.

* * * * *